(12) United States Patent
Jahne et al.

(10) Patent No.: US 6,535,381 B2
(45) Date of Patent: Mar. 18, 2003

(54) HOT SWAP DRAWER ASSEMBLY

(75) Inventors: Craig J. Jahne, Beaverton, OR (US); Lane C. Cobb, Ridgefield, WA (US); Bob Eldridge, Portland, OR (US); Jim D. Williams, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 84 days.

(21) Appl. No.: 09/815,511

(22) Filed: Mar. 22, 2001

(65) Prior Publication Data

US 2002/0135976 A1 Sep. 26, 2002

(51) Int. Cl.$^7$ .................................. G06F 1/16
(52) U.S. Cl. ...................... 361/685; 361/684; 361/683; 361/727; 312/223.1; 364/708.1
(58) Field of Search ................. 361/683–685, 361/724–727, 686; 312/223.1, 223.2; 364/708.1; 174/52.1; 439/928

(56) References Cited

U.S. PATENT DOCUMENTS 5,214,567 A * 5/1993 Feightner et al. ......... 361/393
6,325,353 B1 * 12/2001 Jiang ........................ 248/682
6,450,597 B1 * 9/2002 Bell et al. ................ 312/223.1

OTHER PUBLICATIONS

Article "Pluggable Hard Disk File Assembly", IBM Technical Disclosure Bulletin, Mar. 1990, US, vol. 32, Issue 10B, pp. 300–304.*
Article "Mass Storage Assembly for Continuous On–Line Data", IBM Technical Disclosure Bulletin, May 1989 US, vol. 31, p. 77–81.*

* cited by examiner

*Primary Examiner*—Darren Schuberg
*Assistant Examiner*—Michael Datskovsky
(74) *Attorney, Agent, or Firm*—Mark V. Seeley (57) ABSTRACT

An assembly for a computer system is described. That assembly comprises a frame that has a base, a first side and a second side. The assembly also includes a backplane, which is coupled to the frame, and a connector. The connector has a first end that is coupled to the backplane and a second end for receiving a disk drive connector. The assembly enables a disk drive carrier to be secured between the first and second sides such that it is oriented sideways with respect to a front surface of a computer system chassis. Also described are a disk drive storage unit and a computer system that include that assembly.

20 Claims, 6 Drawing Sheets

HOT SWAP DRAWER ASSEMBLY

FIELD OF THE INVENTION

The present invention relates to disk drive storage units and computer systems that contain them.

BACKGROUND OF THE INVENTION

The telecommunications industry relies upon large banks of servers to store and manage enormous volumes of data. These servers are generally mounted into racks that are positioned on opposite sides of a corridor, which enables access to them. When used for telecommunications applications, servers must ordinarily have a chassis length that does not exceed 20 inches. That constraint inhibits use of servers with chassis that house conventional 12 inch by 13 inch baseboards and typical front to back mounted disk drives, as such chassis will exceed the 20 inch chassis length specification.

Accordingly, there is a need for a computer system that includes a disk drive storage unit and a conventional baseboard, in which the computer system's chassis is no longer than 20 inches. There is a need for such a computer system that is "hot swappable," i.e., one that permits a disk drive to be replaced without having to power down the system. The hot swap drawer assembly of the present invention enables such a computer system.

DETAILED DESCRIPTION OF THE PRESENT INVENTION

An assembly for a computer system is described. That assembly includes a frame that has a base, a first side and a second side. The assembly also includes a backplane, which is coupled to the frame, and a first connector. That connector has a first end that is coupled to the backplane and a second end for receiving a first disk drive connector. The assembly of the present invention enables a first disk drive carrier to be secured between the first and second sides such that it is oriented sideways with respect to a front surface of a computer system chassis. Also described are a disk drive storage unit that includes this assembly, and a computer system that includes such a disk drive storage unit.

In the following description, numerous details are set forth to provide a thorough understanding of the present invention. It will be apparent, however, to those skilled in the art that the invention may be practiced in many ways other than those expressly described here. The invention is thus not limited by the specific details disclosed below.

Figure 1:
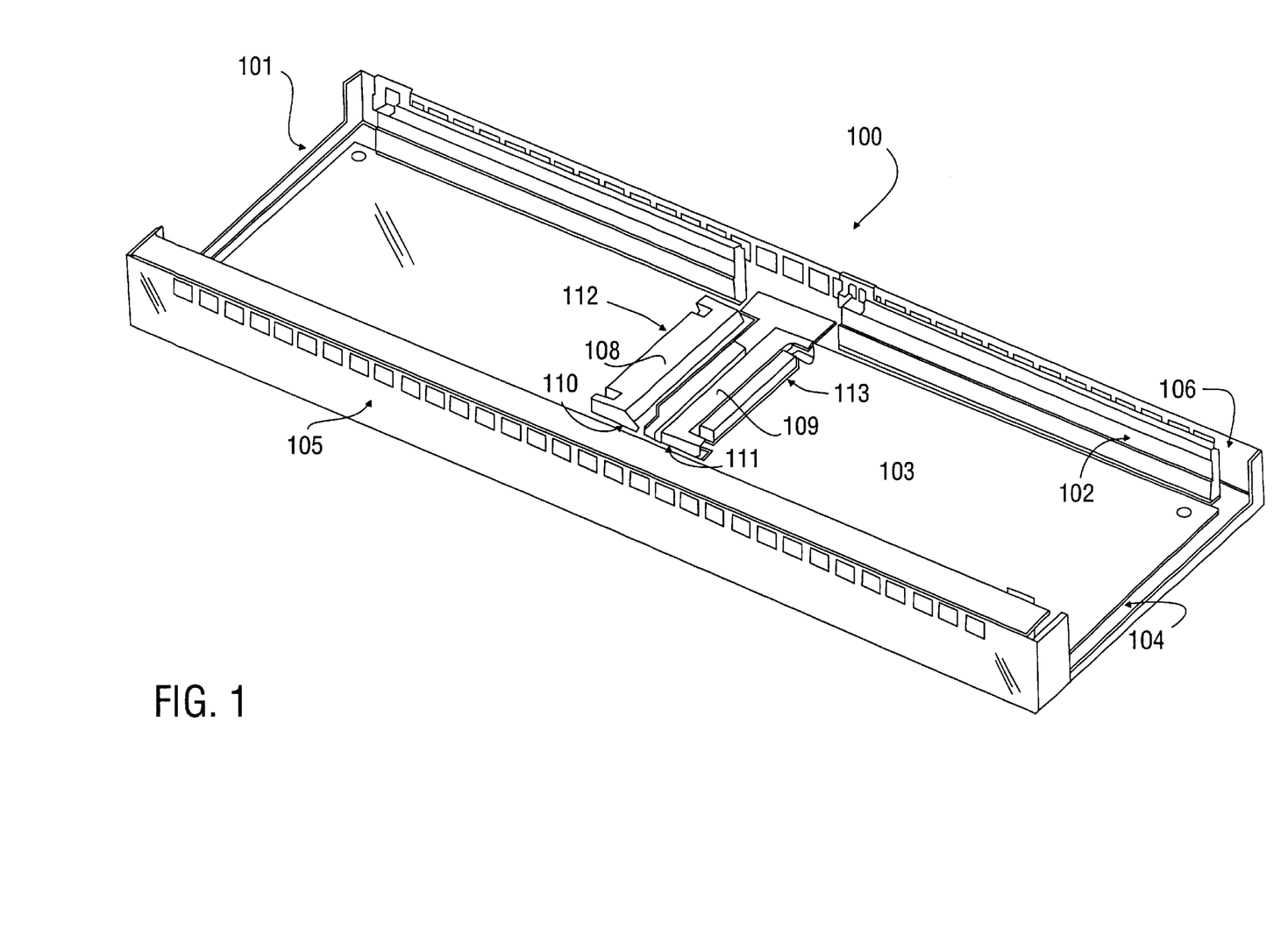
FIG. 1 is a perspective view of an embodiment of the present invention that illustrates an assembly that may be used to receive a pair of disk drives.

FIG. 1 represents an embodiment of an assembly of the present invention that may be used to receive a pair of disk drives. Assembly 100 includes frame 101, which comprises base 104, first side 105 and second side 106. First side 105 is separated from second side 106 by a distance that is slightly greater than the width of a disk drive—preferably between about 4 and about 5 inches. Those sides preferably are each between about 1 and about 2 inches high. Frame 101 enables a disk drive carrier to slide over base 104 and to be secured between first and second sides 105 and 106. In this embodiment of the present invention, sides 105 and 106 (which may be made from extruded aluminum) each include a disk drive carrier retention member—here grooves 102—that provides frame 101 with that capability. Backplane 103 is coupled to frame 101, e.g., by fixing it to base 104 such that disk drive assemblies may slide over it, when they are inserted into frame 101. Backplane 103 includes a connector for coupling it to a cable that may connect backplane 103 to a computing unit.

Assembly 100 further includes a pair of connectors 108, 109. First end 110, 111 of each connector is coupled to backplane 103 near the center of base 104. In this embodiment, second end 112, 113 of each connector is oriented substantially perpendicular to first end 110, 111. Second ends 112, 113 may each receive a disk drive's disk drive connector. In a preferred embodiment, connectors 108, 109 and backplane 103 are SCSI compatible and facilitate hot swapping of disk drives, i.e., they enable a disk drive to be replaced without having to shut down the computer system.

Figure 2:
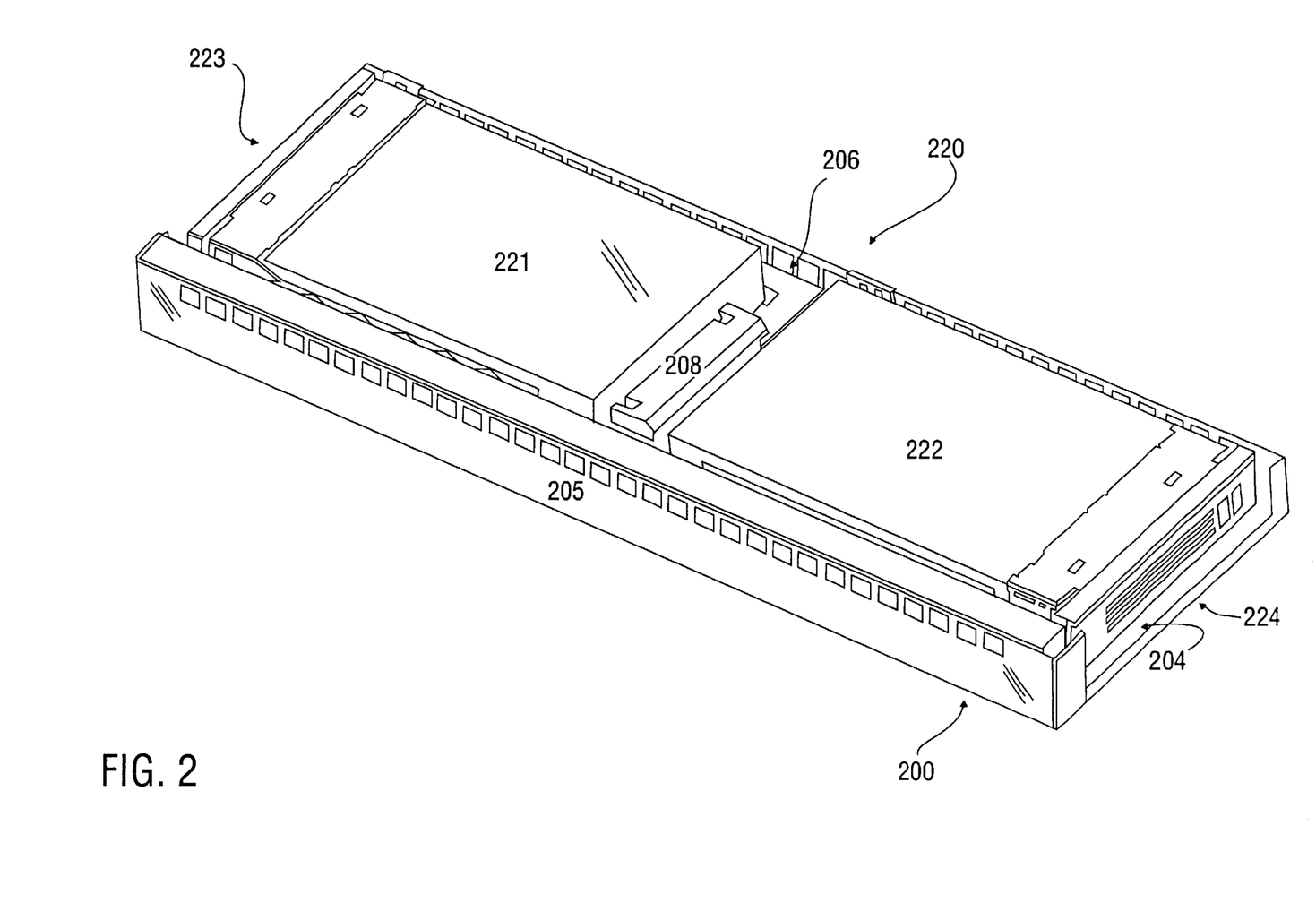
FIG. 2 is a perspective view of an embodiment of a disk drive storage unit of the present invention.

FIG. 2 provides a perspective view of an embodiment of a disk drive storage unit of the present invention that includes the assembly of FIG. 1 and a pair of disk drive assemblies. Disk drive storage unit 220 includes assembly 200 and disk drive assemblies 221 and 222. Each disk drive assembly comprises a disk drive carrier that has a disk drive coupled to it. The disk drive carriers are coupled to sides 205 and 206 by inserting slide rails, which are located on the sides of the disk drive carriers, into the grooves that are formed on sides 205 and 206. Disk drive assembly 221 was installed in assembly 200 by sliding it over base 204 from first end 223 until its disk drive connector was coupled with the second end of connector 208. Similarly, disk drive assembly 222 was slid over base 204 from second end 224 until its disk drive connector was coupled with the other connector that is mounted to the backplane.

When installed, the disk drive connector of disk drive assembly 221 faces the disk drive connector of disk drive assembly 222. Unlike typical disk drive storage assemblies, in which the disk drives all face the same direction and are oriented with the carrier handle facing away from the chassis, storage unit 220 causes the disk drives to be turned sideways with respect to the front of the chassis. Orienting the disk drives sideways with their carriers and connectors facing each other enables a low profile two unit disk drive assembly that may be accommodated by a shorter chassis.

Figure 3:
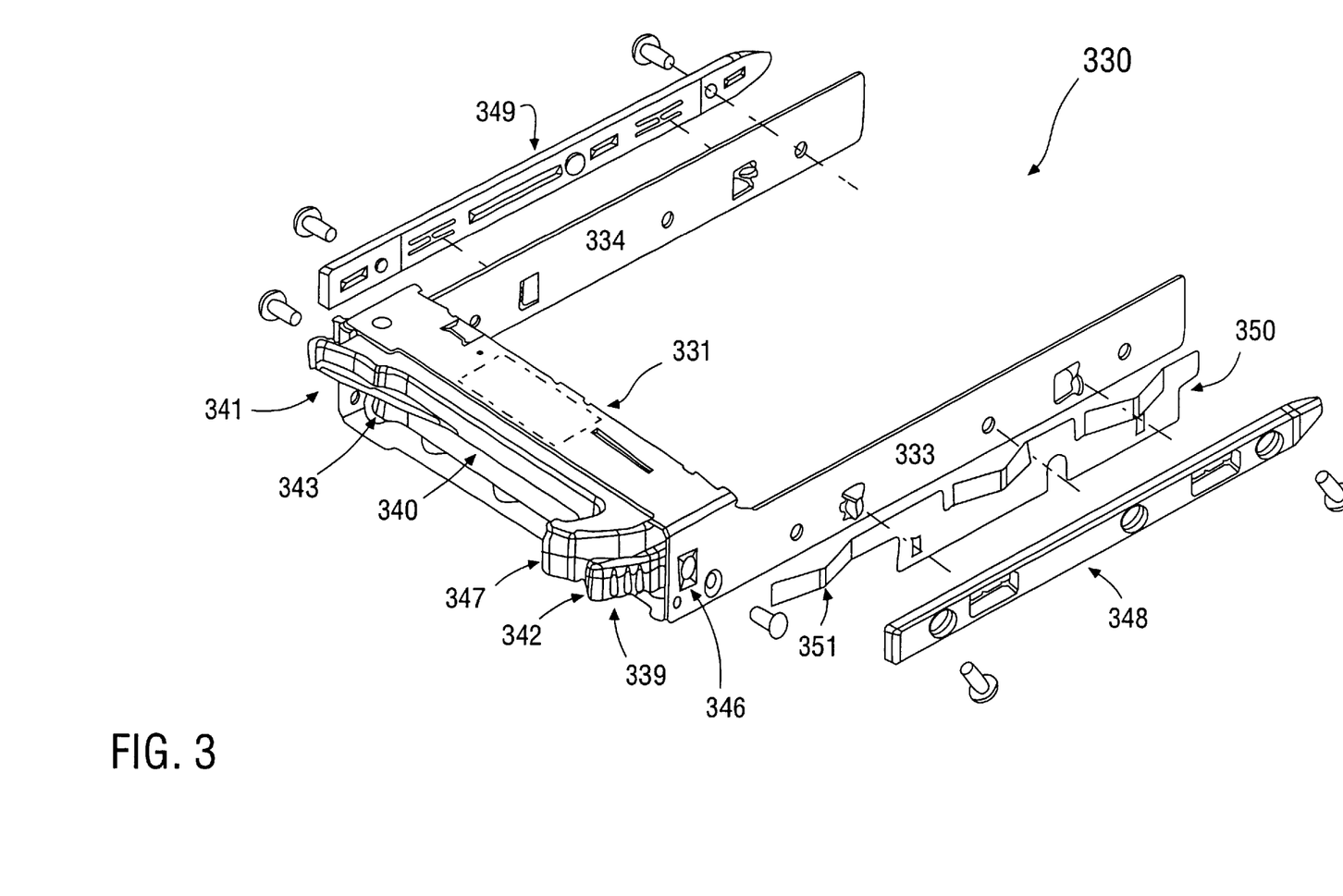
FIG. 3 is a partially exploded view of a disk drive carrier that may be used to make the disk drive storage unit of FIG. 2.

FIG. 3 illustrates a disk drive carrier that may be used to make the disk drive storage unit of FIG. 2. Disk drive carrier 330 comprises frame 331 and handle 340. Frame 331 includes first arm 333 and second arm 334. Handle 340 includes first end 339 and second end 341. End 339 includes pawl 342, and end 341 includes pin 343. Pin 343 enables handle 340 to rotate from an open position to a closed position. When a rib of pawl 342 passes through aperture 346, which is formed in arm 333, handle 340 is locked into the closed position—as shown here. Handle 340 may be released from the closed position by squeezing pawl 342 and shoulder 347, which will cause the rib to slip below aperture 346, enabling pawl 342 to disengage from aperture 346. Releasing pawl 342 from aperture 346 enables disk drive carrier 330 to be removed from disk drive storage unit 220. In a preferred embodiment, handle 340 comprises a one piece integrated structure formed from a high strength engineering plastic, such as a polycarbonate.

Disk drive carrier 330 further includes first slide rail 348, which is coupled to arm 333, and second slide rail 349, which is coupled to arm 334. Rails 348 and 349 will slide into grooves formed in sides 205 and 206 of assembly 200, when carrier 330 is inserted into that assembly. Rails 348 and 349 are preferably made from a high density polymer, e.g., a polyamide based engineering plastic like those available from BASF Aktiengesellschaft under the trademark Ultramid®. Although such materials are preferred, rails 348 and 349 may be made from other materials of equal hardness that have shock absorbing properties and that are relatively slick, which enables the rails to easily slide along the grooves formed in the sides of assembly 200.

In this embodiment, rails 348 and 349 include openings that enable screws to pass through them, and through matching orifices formed in arms 333 and 334, for engagement with a disk drive that may be attached to carrier 330. When that occurs, the disk drive, in essence, contributes part of the support structure for the disk drive carrier.

Spring 350 may be positioned between rail 348 and arm 333 to block electromagnetic emissions and protect against electrostatic discharge. Spring 350 includes bent flexible sections 351 that will contact sides 205 and 206, when the carrier is inserted into assembly 200. The flexible nature of those sections ensures good contact with sides 205 and 206, which enables electrostatic discharge from the carrier assembly to ground. Spring 350 is preferably made from stainless steel, but may be made from other noncorrosive materials that provide the desired flexibility and electrical characteristics.

Disk drive carrier 330, as shown in FIG. 3, is designed to receive a 1 inch thick disk drive. Alternative embodiments may accommodate a 1.6 inch thick disk drive instead. Disk drive assemblies 221 and 222 preferably include standard 3½ inch disk drives, which may be contained in a standard case that is about 4 inches wide and about 5 inches long.

Figure 4:
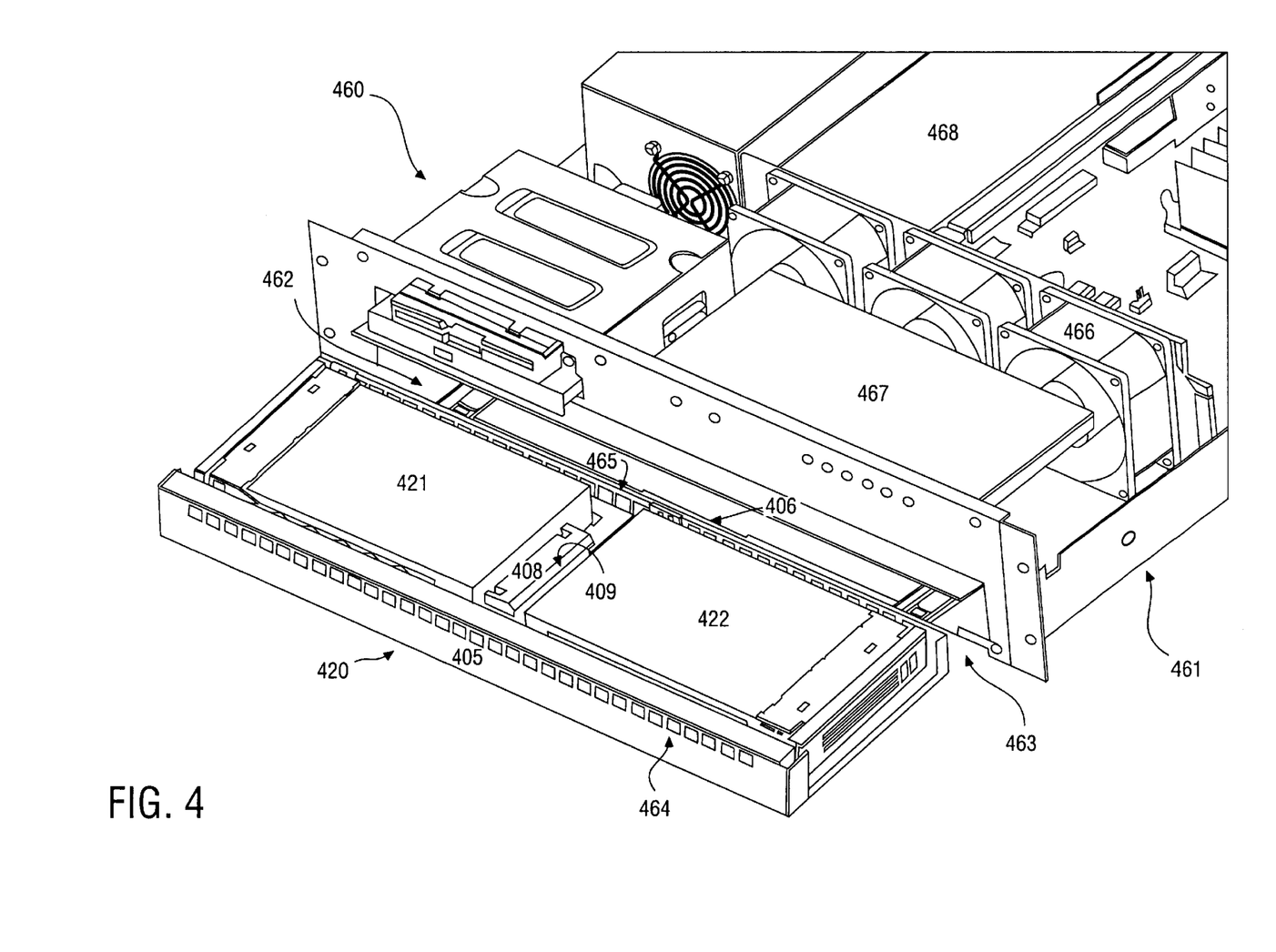
FIG. 4 is a perspective view of an embodiment of a computer system that includes the disk drive storage unit of FIG. 2.

FIG. 4 represents a computer system that includes the disk drive storage unit of FIG. 2. Computer system 460 comprises chassis 461, which includes front compartment 467 and back compartment 468. Front compartment 467 includes front surface 463 and back compartment 468 includes a back panel (not shown). A computing unit is housed in back compartment 468 of chassis 461. That computing unit may include a conventional 12 inch by 13 inch baseboard, upon which are mounted one or more CPUs, chipset components, memory devices, and various other standard components.

Computer system 460 further comprises disk drive storage unit 420, which includes disk drive assemblies 421, 422 that are coupled to right angle SCSI connectors 408, 409. Disk drive storage unit 420 is coupled to chassis 461 and the computing unit. In this embodiment of the present invention, a coupling member, here rods 462, couples chassis 461 to disk drive storage unit 420. Although this embodiment uses rods 462 to perform that attachment function, many other mechanisms may be employed instead, e.g., various types of bars, strips, etc . . . , that enable disk drive storage unit 420 to slide into and out of front compartment 467 of chassis 461.

The length of chassis 461, as measured from front surface 463, where it receives disk drive storage unit 420, to the back panel preferably is less than or equal to about 20 inches. Grilles 464, 465 are formed at the upper ends of sides 405 and 406 of disk drive storage unit 420. Chassis 461 houses fans 466, which will be located behind disk drive storage unit 420, when disk drive storage unit 420 is inserted into front compartment 467. When operating, those fans draw air over disk drive storage unit 420, through grilles 464, 465, and into back compartment 468 of chassis 461 to cool components that are located in that section of computer system 460. A standard ribbon cable (not shown) may connect the backplane contained in disk drive storage unit 420 to the computing unit.

Figure 5:
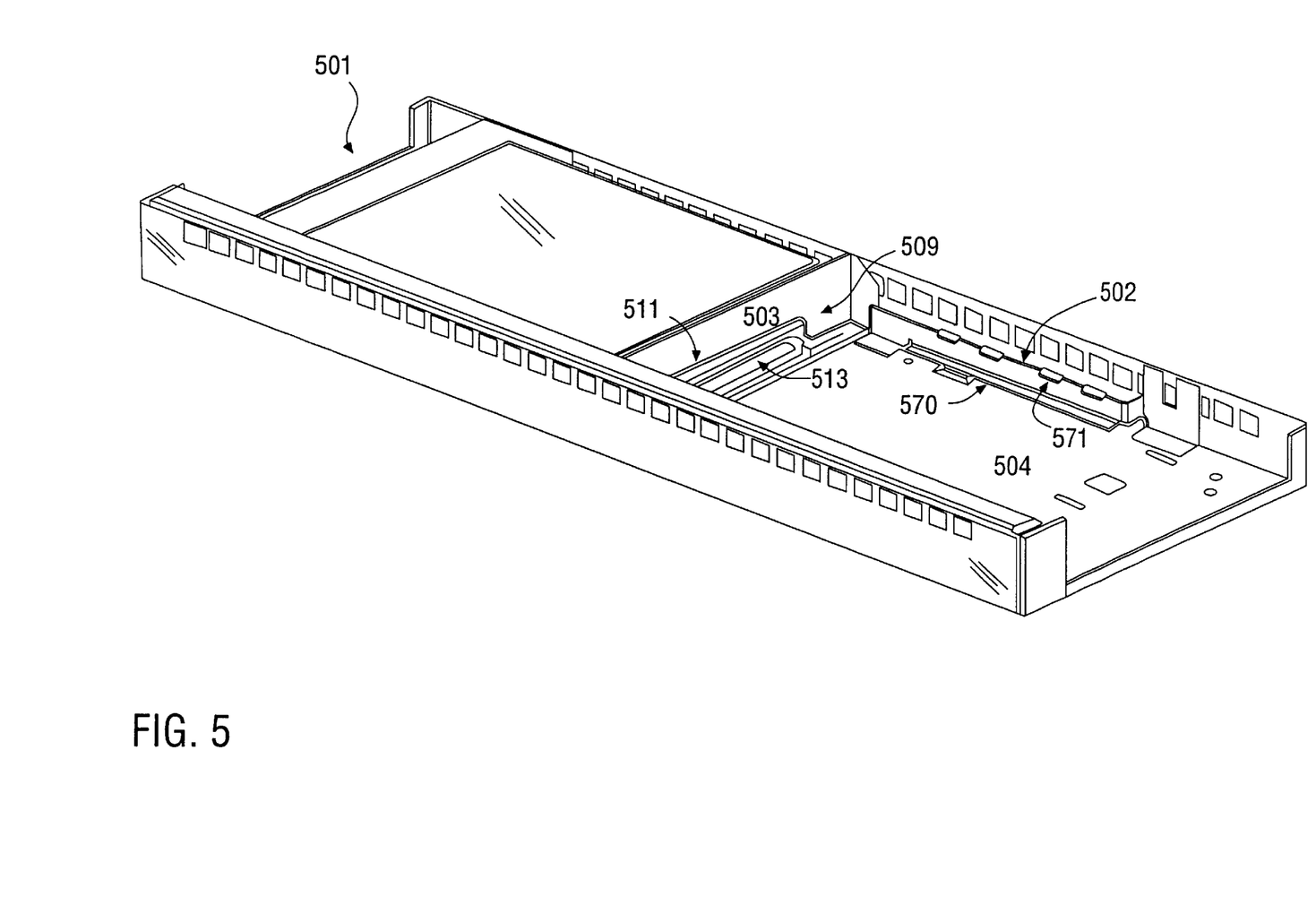
FIG. 5 is a perspective view of a second embodiment of the present invention that illustrates an assembly that may be used to receive a pair of disk drives.

Although the embodiments described above use a right angle SCSI connector to couple a disk drive to a backplane, other types of connectors may be used instead. FIG. 5 illustrates an alternative embodiment in which backplane 503 is oriented substantially perpendicular to base 504 of frame 501. In this embodiment, connector 509 includes first end 511, which is coupled to backplane 503, and second end 513 for receiving a disk drive connector. Unlike the previously described embodiments, first end 511 of connector 509 lies in the same plane as second end 513 of connector 509.

In addition, disk drive carrier retention member 502 differs from disk drive carrier retention member 102, shown above. Instead of grooves formed in the sides of frame 501, retention member 502 comprises a guide rail, which has shelf 570 and tabs 571, that serves to secure a disk drive carrier. Those skilled in the art will recognize that many other mechanisms may be used to secure a disk drive carrier within frame 501.

Figure 6:
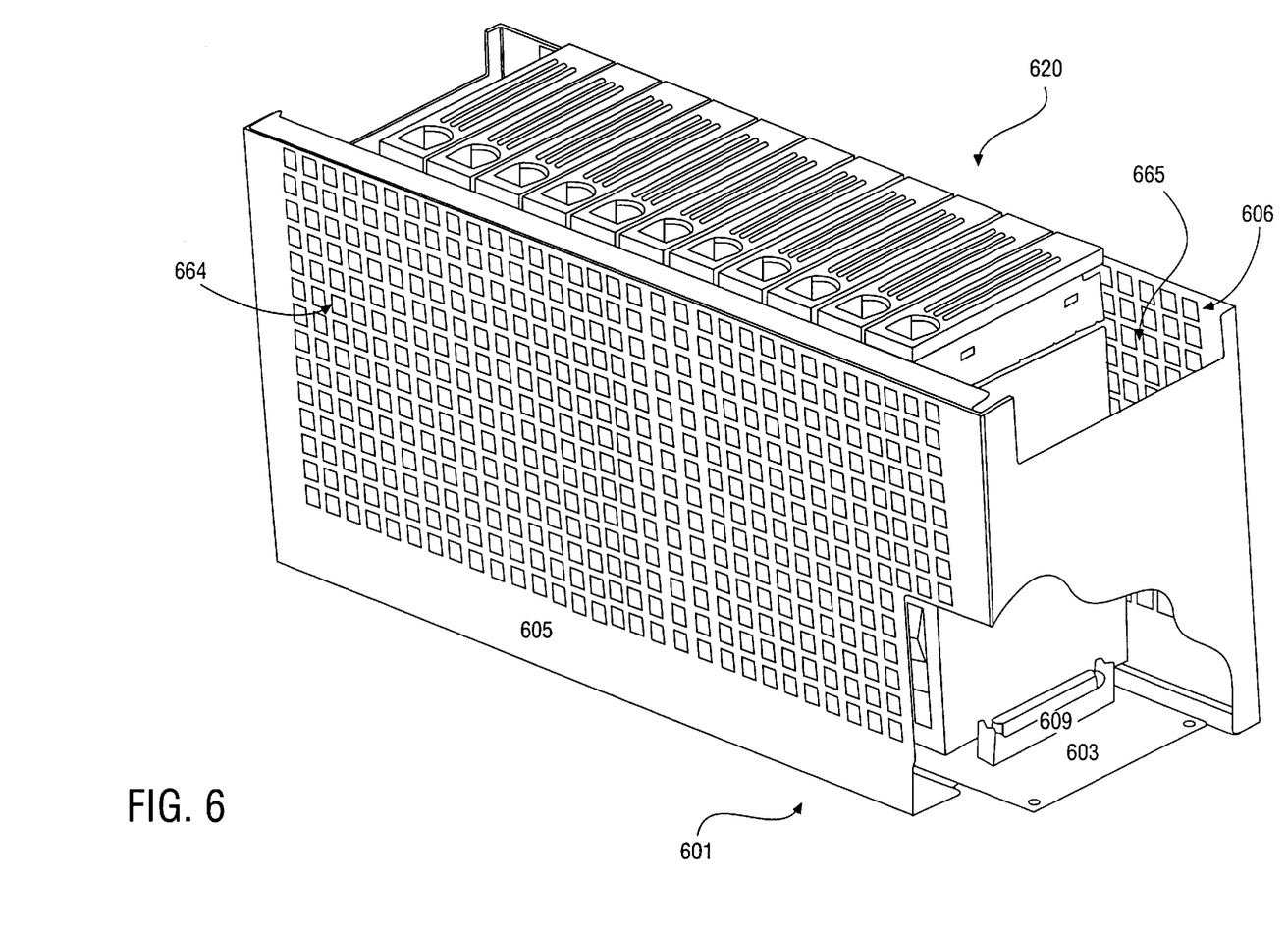
FIG. 6 is a perspective view of a second embodiment of a disk drive storage unit of the present invention.

Although the embodiments disclosed above relate to an assembly that accommodates two disk drives, alternative embodiments may accommodate one disk drive or more than two disk drives. When designed for additional disk drives, the disk drives may be stacked on top of each other in one or more trays, or be placed side by side. Alternatively, as shown in FIG. 6, disk drives can be mounted upright, while retaining a sideways orientation with respect to a front surface of a computer system chassis.

In this embodiment, disk drive storage unit 620 includes backplane 603, which is attached to the base of frame 601. Connector 609 is connected to backplane 603 at one end and may be connected to a disk drive assembly at the other end. Like the embodiment shown in FIG. 5, those ends of that connector lie in the same plane. The disk drive assemblies included in disk drive storage unit 620 may be removed by raising them out of the top of that storage unit. Those disk drive assemblies are secured within frame 601 by sliding their disk drive carriers into guide rails (not shown) that are fixed to sides 605 and 606. (Sides 605 and 606 preferably will be about 7 inches high.) Those rails could be mounted to grilles 664, 665, such that they are oriented vertically with respect to the base of frame 601. This embodiment of the present invention may be used with relatively large rack mounted computer systems that require several disk drives, while still enabling the computer system chassis to meet the 20 inch chassis length specification.

An improved assembly for a computer system (and a disk drive storage unit and computer system that include such an assembly) has been described. That assembly receives disk drives such that they are oriented sideways in relation to a front surface of a computer system chassis. That sideways orientation enables a 20 inch long chassis to house both a conventional 12 inch by 13 inch baseboard and the disk drive assembly. When a low profile computer system is desired, which still provides hot swap capability, disk drives may be placed sideways in a tray that may be slid into and out of the computer system chassis. When used in a larger rack mounted product, disk drives may be placed upright, while still turned sideways, to enable a relatively large number of disk drives to be used in a system that has a 20 inch chassis.

Features shown in the above referenced drawings are not intended to be drawn to scale, nor are they intended to be shown in precise positional relationship. Additional components that may be included in the illustrated assembly, disk drive storage unit, and computer system have been omitted as they are not useful to describe aspects of the present invention.

Although the foregoing description has specified an assembly, disk drive storage unit and computer system that includes certain features, those skilled in the art will appreciate that many modifications and substitutions may be made. It is intended that all such modifications, alterations, substitutions and additions be considered to fall within the spirit and scope of the invention as defined by the appended claims.

What is claimed is:

1. An assembly for a computer system comprising:
    a frame that has a base, a first side and a second side;
    a backplane, which is coupled to the frame; and
    a first connector with a first end that is coupled to the backplane and a second end for receiving a first disk drive connector;
    wherein a first disk drive carrier may be secured between the first and second sides such that it is oriented sideways with respect to a front surface of a computer system chassis.

2. The assembly of claim 1 wherein the first side is separated from the second side by a distance that is slightly greater than the width of a first disk drive, the frame enables a first disk drive carrier to slide over the base when being secured between the first and second sides, and the backplane is fixed to the base such that a first disk drive carrier sliding over the base to connect a first disk drive connector with the second end of the first connector will also slide over the backplane.

3. The assembly of claim 1 wherein the base has a center, a first end and a second end; wherein the first connector is coupled to the backplane near the center of the base; and further comprising a second connector, the second connector having a first end that is coupled to the backplane near the center of the base and a second end for receiving a second disk drive connector.

4. The assembly of claim 3 wherein the first connector may receive a first disk drive connector and the second connector may receive a second disk drive connector such that the first disk drive connector faces the second disk drive connector.

5. The assembly of claim 4 wherein the backplane is connected to the base of the frame such that it is oriented substantially perpendicular to the base.

6. The assembly of claim 4 wherein the first end of the first connector is oriented substantially perpendicular to the second end of the first connector and the first end of the second connector is oriented substantially perpendicular to the second end of the second connector.

7. The assembly of claim 4 wherein the first and second sides each have a disk drive carrier retention member, are each between about 1 and about 2 inches high, and are separated from each other by between about 4 and about 5 inches, and wherein the backplane includes a connector for coupling it to a cable that may connect the backplane to a computing unit.

8. The assembly of claim 1 wherein the second end of the first connector may receive a first disk drive connector such that a first disk drive carrier may be oriented substantially perpendicular to the base of the frame.

9. The assembly of claim 1 wherein the first and second sides each include a grille.

10. A disk drive storage unit comprising:
    a frame having a base, a first side and a second side;
    a backplane, which is coupled to the frame;
    a first connector that has a first end, which is coupled to the backplane, and a second end; and
    a first disk drive assembly that comprises:
        a first disk drive carrier that has a handle, and
        a first disk drive, which has a first disk drive connector, the first disk drive being coupled to the first disk drive carrier;
    wherein the first disk drive carrier is coupled to the first and second sides, and the second end of the first connector is coupled to the first disk drive connector such that the handle of the first disk drive carrier may be oriented sideways with respect to a front surface of a computer system chassis.

11. The disk drive storage unit of claim 10 further comprising:
    a second connector that has a first end that is coupled to the backplane and a second end; and
    a second disk drive assembly that includes a second disk drive carrier, which has a handle, that is coupled to a second disk drive, the second disk drive having a second disk drive connector;
    wherein the second end of the second connector is connected to the second disk drive connector such that the first disk drive connector of the first disk drive faces the second disk drive connector of the second disk drive.

12. The disk drive storage unit of claim 11 wherein the first and second sides each include a disk drive carrier retention member and the first and second disk drive carriers each include slide rails, and wherein the first and second disk drive assemblies are coupled to the first and second sides when the disk drive carrier retention members engage those slide rails.

13. The disk drive storage unit of claim 12 wherein the first and second sides are each between about 1 and about 2 inches high and are separated from each other by between about 4 and about 5 inches, and wherein the first and second disk drives are standard 3½ inch disk drives, and further comprising a cable that is connected to the backplane for connecting the backplane to a computing unit.

14. A computer system comprising:
    a chassis that has a front compartment and a back compartment, the front compartment having a front surface, and the back compartment having a back panel;
    a computing unit that is housed in the back compartment of the chassis, and
    a disk drive storage unit, which is coupled to the computing unit and the chassis, that may slide into and out of the front compartment of the chassis, the disk drive storage unit comprising:

a frame that has a base, a first side and a second side;

a backplane, which is coupled to the frame;

a first connector that has a first end that is coupled to the backplane; and a first disk drive assembly that is coupled to a second end of the first connector, the first disk drive assembly comprising:

a first disk drive carrier that has a handle, and a first disk drive that is coupled to the first disk drive carrier;

wherein the first disk drive carrier is secured between the first and second sides with the handle being oriented sideways with respect to the front surface of the front compartment of the chassis.

15. The computer system of claim 14 wherein the disk drive storage unit further comprises:

a second connector that has a first end that is coupled to the backplane; and a second disk drive assembly that is coupled to a second end of the second connector, the second disk drive assembly having a second disk drive carrier that is coupled to a second disk drive;

wherein the second disk drive carrier faces the first disk drive carrier.

16. The computer system of claim 14 wherein the first and second sides of the frame are each between about 1 and about 2 inches high and are separated from each other by between about 4 and about 5 inches, and wherein the first disk drive is a standard 3½ inch disk drive, and further comprising a cable that connects the backplane to the computing unit.

17. The computer system of claim 14 wherein the disk drive storage unit is coupled to the chassis by a coupling member that enables the disk drive storage unit to slide into and out of the front compartment of the chassis.

18. The computer system of claim 14 wherein the length of the chassis, as measured from the front surface to the back panel, is less than or equal to about 20 inches, and wherein the computing unit comprises a 12 inch by 13 inch baseboard.

19. The computer system of claim 14 wherein the first end of the first connector is oriented substantially perpendicular to the second end of the first connector.

20. The computer system of claim 14 wherein the disk drive storage unit comprises a plurality of disk drive assemblies that are each oriented substantially perpendicular to the base of the frame.

* * * * *